United States Patent [19]

Richard

[11] 4,233,862
[45] Nov. 18, 1980

[54] DEVICE FOR SELECTING CHARACTERISTICS OF A TRANSMISSION BETWEEN A MOTOR AND ITS LOAD

[75] Inventor: Andre M. E. Richard, La Celle-Saint-Cloud, France

[73] Assignee: Agence Nationale de Valorisation de la Recherche (ANVAR), Neuilly-sur-Seine, France

[21] Appl. No.: 807,481

[22] Filed: Jun. 17, 1977

Related U.S. Application Data

[63] Continuation-in-part of Ser. No. 593,117, Jul. 3, 1975, abandoned.

[30] Foreign Application Priority Data

Jul. 5, 1974 [FR] France .................................. 74 23394
Jun. 25, 1975 [FR] France .................................. 75 19959

[51] Int. Cl.$^3$ .............................................. B60K 41/04
[52] U.S. Cl. ..................................................... 74/866
[58] Field of Search ........................................ 74/866

[56] References Cited

U.S. PATENT DOCUMENTS 3,724,293  4/1973  Wakamatsu et al. ................. 74/866
3,882,740  5/1975  Joachim et al. ...................... 74/866

Primary Examiner—Samuel Scott
Assistant Examiner—Wesley S. Ratliff, Jr.
Attorney, Agent, or Firm—Eric P. Schellin

[57] ABSTRACT

This device comprises a generator of electric signals adapted to generate a first signal whose frequency is proportional to the speed of the output shaft of the transmission and whose amplitude is a function of the load of the motor with which this transmission is associated, and means for producing from said signal the ratio change characteristics.

The device further comprises means for producing from the generator signal an additional electric signal whose amplitude is a function of the frequency of the first signal, means for weighting and comparing said first signal and said additional signal so as to obtain a signal representing periodically the desired state of the transmission, and means for memorizing the desired state of the transmission connected to the measuring and comparing means to change the transmission from one ratio to the next ratio as a function of the signal produced by the weighting and comparing means.

15 Claims, 30 Drawing Figures

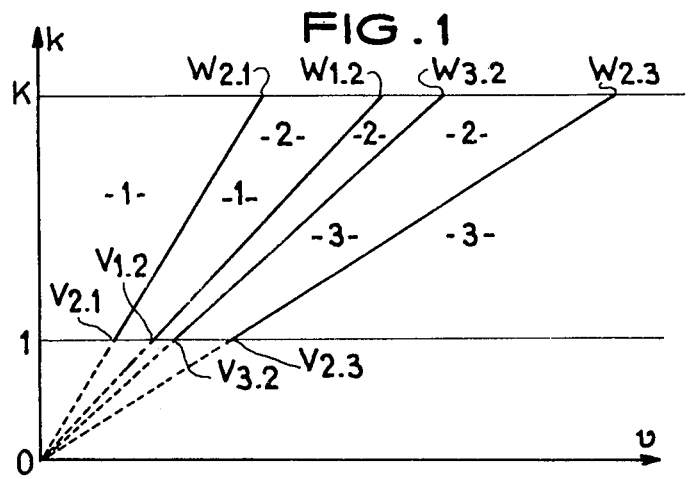
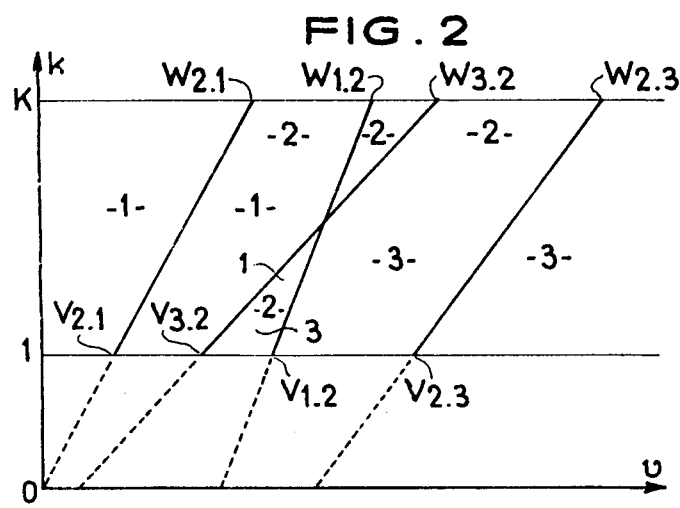
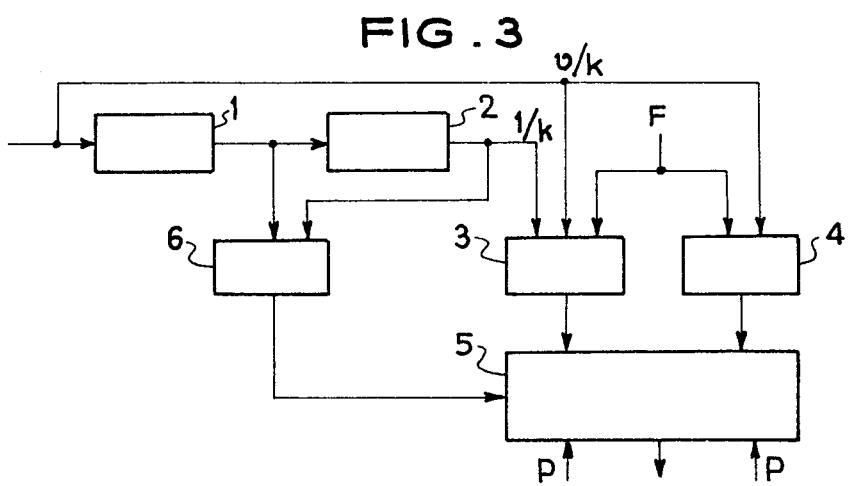

DEVICE FOR SELECTING CHARACTERISTICS OF A TRANSMISSION BETWEEN A MOTOR AND ITS LOAD

This application is a continuation-in-part of my application Ser. No. 593,117, filed July 3, 1975, now abandoned.

The present invention relates to transmission devices inserted between an engine and the load thereof, particularly but not exclusively in automobile vehicles.

Such a transmission device includes two or more "torque transfer characteristics" or "transfer characteristics". A transfer characteristic is defined as being the curve representing the variation of the input torque/output torque ratio as a function of the output shaft speed.

The transfer characteristic change is generally obtained by way of the change of a gear ratio or "change of ratio".

The invention relates particularly but not exclusively to a transmission of this kind.

The invention concerns the transmission devices the transmission characteristic change of which is obtained automatically through an electric control and among such transmission devices, those wherein the variables used for determining the changes are the engine load and the output shaft speed.

French Pat. No. 1,452, 722 and U.S. Pat. No. 3,403,747 disclose electrical control devices operating as a function of the engine load and of the output shaft speed, wherein a single alternating signal carries the information relative to the engine load and to the speed of the output shaft.

The A.C. current source is an alternator rotatably mounted on the output shaft of the transmission.

In the device disclosed in French Pat. No. 1,452,722, a variable coupling transformer is inserted between the alternator and the control device, the coupling variation being provided by motion of the secondary winding relative to the primary winding.

U.S. Pat. No. 3,344,294 discloses an alternator the e.m.f. of which is a function of the portion of moving pole pieces which are moving relative to the fixed pole pieces.

The moving part of either one of these two devices being mechanically coupled to the pedal of the accelerator, a signal is provided the frequency of which is proportional to the speed of the output shaft of the transmission and the amplitude of which is proportional to the speed and a function of the load of the engine. These devices are manufactured without moving electric contacts, so that they have a good safety of operation.

In a transmission wherein the changes of ratio are determined by the engine load and by the output shaft speed, a determined ratio change, for instance from ratio 1 to ratio 2, occurs only when a relation exists between these two variables.

A relation exists for each couple of consecutive ratios and for each direction of passage. The curves representing these relations are the "ratio change characteristics" or more simply "change characteristics".

The cited control devices are here considered as defining the prior art concerning the devices to which the information relative to the load of the engine is provided by an alternating signal whose amplitude and frequency further vary as a function of the output shaft speed. At the input of these devices, a single alternating signal is available. Further, only the amplitude of this signal is used. Consequently, the "change characteristics" defined thereby are very dependent one from the other.

The result of this is that if the load of the engine is low or null, the ratio changes-up occur at speeds that are lower than speeds which would give the best compromise among the different determining factors such as the transmission efficiency, and the driving comfort.

Further, the electric signal available at the input of the device is rectified and filtered before being used.

The result of this is that the amplitude drop consecutive to a sharp increase of the load of the engine is transmitted only progressively and that the corresponding ratio changes are controlled with some delay.

Prior art selecting devices have therefore the following drawbacks:

The ratio changes are in many cases premature in that it would be better to keep a given ratio for a longer period.

When a ratio change is made towards a "longer" ratio, that is to say that the ratio between the input and output speeds of the transmission decreases, the possibility of acceleration is reduced and, if the transmission comprises a hydraulic converter or coupler, the slip of this device increases and the efficiency of the transmission decreases.

Such a situation orients the choice of the properties of the hydraulic device in a direction which is unfavourable to the vigour of the starting offs, to the smoothness of the ratio changes and to the service life of the friction means of the transmission. The ratio changes are, under certain conditions of utilization, much more frequent than is necessary.

When a ratio change is not justified at the time, it frequently happens that the evolution of the conditions of operation, far from justifying this change afterwards, causes a ratio change in the opposite direction. Pairs of ratio changes are therefore produced in this case which are useless. Such operation of the transmission is unpleasant to the user and results in premature wear of the parts of the transmission.

In order to obtain a volontary gearing down, that is to say a change to a "shorter" transmission ratio, the carburetor opening control must be acted upon for an appreciable length of time.

When such an operation is carried out for the purpose of benefiting from an increased braking by the engine, a noticeable acceleration impulse is first obtained which is contrary to the desired effect. As soon as the butterfly member opening control is released, a ratio change in the opposite direction occurs in most cases. The closure of the butterfly member of the carburettor results too often in a change to a "longer" ratio, which reduces the efficiency of the braking by the engine.

An object of the invention is to overcome the aforementioned drawbacks and to provide a device without moving electric contact for selecting transfer characteristics of a transmission between an engine or motor and a load, which permits:

selecting at each instant a transfer characteristic appropriate to the operational conditions, so as to maintain the engine and the transmission in a range of operation being a good compromise from the point of view of wear, heating, efficiency, noise and pollution;

avoiding ratio changes so long as the engine and the transmission remain in said range of operation;

maintaining the transfer characteristics of the transmission permitting a high driving or braking torque at the output of the transmission within the limits of said operating range;

rapidly establishing the transfer characteristics permitting an increased braking or driving torque at the output of the transmission.

According to the invention, there is provided a device for selecting characteristics of a transmission, in particular for automobile vehicles, comprising a first electric signal generator coupled to the output shaft of the transmission and adapted to generate a first signal whose frequency and amplitude are proportional to the speed of the output shaft of the transmission and whose amplitude is moreover inversely proportional to the load of the engine, and means for producing from said signal the characteristics of change between the ratios of the transmission, wherein the device further comprises means for producing an additional electric signal whose level is exclusively a function of the load on the engine with which said transmission is associated, means for weighting and comparing said first signal and said additional signal so as to obtain signals representing, once per period of the signal of the generator, the desired state of the transmission and means for memorizing the desired state of the transmission connected to said weighting and comparing means, said memorizing means being adapted to cause the change of the transmission from one ratio to a neighbouring ratio as a function of the signal produced by said weighting and comparing means, which produces the desired state of the transmission.

Further features of the invention will be apparent from the ensuing description with reference to the accompanying drawings which are given solely by way of example and wherein:

FIG. 1 is a graph showing the ratio change characteristics of a transmission having three ratios obtained by a prior art selecting device;

FIG. 2 is a graph showing the ratio change characteristics which may be obtained by means of the selecting device according to the invention;

FIG. 3 is a block diagram of the ratio selecting device according to the invention;

Figure 4:
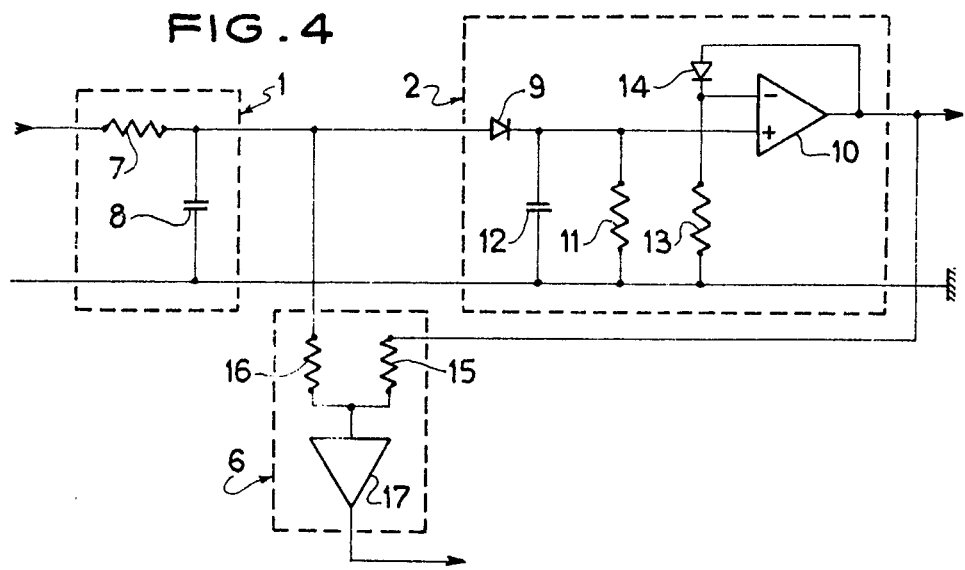
FIG. 4 is an electric diagram of a part of the device shown in FIG. 3.

For the description of the properties of selecting devices there will be employed two variables, the first "v" representing the transmission output speed and the second "k" representing the engine load. The variable "k" has for extreme values "1" and "K" and is a direct but not linear function of the opening of the carburettor.

FIG. 1 is a graph representing the ratio change characteristics of a prior art transmission having three ratios. These characteristics are commonly obtained by a comparison of the amplitude of the signal proportional to v/k produced by the generator with constant thresholds representing the values of the v ratio for which the changes of transmission ratios must occur. It will be observed that these characteristics are rectilinear and their extensions all pass through the origin.

The ratio v/k is constant along a characteristic so that there is obtained $v/k = W_{ij}/K = V_{ij}$ wherein $V_{ij}$ and $W_{ij}$ are extreme values of the speed at which there is a change from one ratio i to a neighbouring ratio j.

$V_{ij}$ and $W_{ij}$ respectively correspond to the values 1 and K of the parameter k.

The indices i and j can have the values 1, 2 and 3, but the couples of value i, j = 1,3 or 3,1 are excluded. There are therefore two characteristics per pair of consecutive ratios, one for each direction of change from one ratio to the next ratio.

These characteristics define the zones where the numbers of the permitted ratios are plotted.

The zones such as 1,2 or 3,2 where two ratios are permitted are termed "hysteresis" zones.

The choice of said thresholds of change between the ratios and of the ratio K does not permit avoiding the relations interrelating the changing speed.

Indeed, with reference to FIG. 1, it may be deduced that:

$$(W_{21}/V_{21})=(W_{12}/V_{12})=(W_{32}/V_{32})=(W_{23}/V_{23})=(-K/1)$$

Consequently, FIG. 1 illustrates the limitations to which prior art automatic devices for selecting transmission ratios are subjected.

The graph shown in FIG. 2 gives an example of the ratio change characteristics that the device according to the invention permits obtaining.

In this Figure it will be observed that the values Vij and Wij are independent from each other. It can be seen that:

$$(W_{21}/V_{21}) > (W_{12}/V_{12})$$
and
$$(W_{32}/V_{32}) > (W_{23}/V_{23})$$

Moreover, it is noticed that the hysteresis zones 1,2 and 3,2 have a common part 1,2,3 in which the three ratios are permitted.

A selecting device according to the invention is shown diagrammatically in FIG. 3.

For reasons of simplicity it has been assumed that the selecting device is associated with a transmission having two transmission ratios.

This device comprises an integrating circuit 1 whose input is connected to the output of a signal generator whose frequency is proportional to the speed v of the output shaft of the transmission to be controlled and whose amplitude is proportional to v and inversely proportional to the opening of the carburetor, that is to say, the extent to which the accelerator pedal of the vehicle equipped with the considered transmission is depressed.

The output of the integrator 1 is connected to a rectifying and filtering circuit 2 whose output is connected to a first weighting and comparing circuit 3, a second input of the circuit 3 is directly connected to the output of the aforementioned generator and a third input is connected to a source of reference voltage (F).

The first circuit 3 for weighting and comparing is adapted to establish the characteristic of change from the ratio 1 to the ratio 2.

The device further comprises a second circuit 4 for establishing the characteristic of change from the ratio 2 to the ratio 1. This circuit is also a weighting and comparing circuit. It comprises a first input which receives the signal from the generator coupled to the transmission and a second input connected to the source of reference voltage.

The outputs of the circuits 3 and 4 are connected to the corresponding inputs of a memory circuit 5 whose output is connected to means (not shown) for controlling the changing of the ratios of the transmission. Two additional inputs PP may be provided for to perform auxiliary functions.

The output of the integrator 1 and the output of circuit 2 are moreover connected to a control input of the memory circuit through a circuit 6 for generating a sampling signal.

With reference again to FIG. 2, it will be observed that, in the considered example, the characteristic of change from the ratio 2 to the ratio 1 passes through the origin whereas the characteristic of change from the ratio 1 to the ratio 2 passes to the right of the origin.

The device shown in FIG. 3 has for function to control the ratio changes as a function of the conditions of operation, in accordance with these characteristics.

It is known that the signal produced by the generator coupled to the output of the transmission is proportional to the ratio v/k between the speed v of the transmission and a value k indicating the opening of the carburettor, that is to say, the extent to which the accelerator pedal is depressed.

In order that the characteristic of change from ratio 2 to ratio 1 be respected, the following relation must be satisfied:

$$v/k = p_{21}F \quad (1)$$

wherein $p_{21}$ is a weighting coefficient of the reference level F.

The relation (1) is in fact the equation of the straight line joining the points $v_{21}$ and $W_{21}$.

For the change from ratio 1 to ratio 2, v/k must satisfy the relation:

$$v/k = p_{12}F + q_{12}/k \quad (2)$$

wherein $p_{12}$ and $q_{12}$ are respectively the weighting coefficients of the fixed reference F and of the inverse of k.

The relation (2) is the equation of the straight line joining the points $V_{12}$ and $W_{12}$.

From the relations (1) and (2) and the values of the speed $V_{21}$, $W_{21}$ and $V_{12}$, $W_{12}$ there are determined the coefficients $p_{12}$, $p_{21}$, $q_{12}$ and the ratio K of reduction of the signal.

There is indeed obtained from the characteristic of the change from ratio 2 to ratio 1:

$$(W_{21}/k) = (v_{21}/1) \text{ and } K = (W_{21}/V_{21}) \quad (3)$$

From the equation (1) there is derived:

$$p_{21} = (v/kF) = (V_{21}/1 \times F) = (V_{21}/F) \quad (4)$$

The weighting coefficients $p_{12}$ and $q_{12}$ are given by the equations:

$$p_{12} = \frac{(W_{12} - V_{12}) V_{21}}{(W_{21} - V_{21}) F} \quad (5)$$

$$q_{12} = \frac{V_{12} W_{21} - W_{12} V_{21}}{W_{21} - V_{21}} \quad (6)$$

To obtain the suitable change characteristics the devices 3 and 4 shown in FIG. 3 which receive at their inputs signals proportional to v/k and 1/k and the reference F effect the weighting in accordance with the coefficients $p_{21}$, $p_{12}$ and $q_{12}$ defined hereinbefore.

FIG. 4 is a more detailed diagram of a part of the selecting device according to the invention.

In FIG. 4 there is shown the integrator, the rectifying and filtering circuit and the zero-detecting circuit 6 shown in FIG. 3. The various circuits are shown with rectangles in dotted line and carry the same reference numerals as the corresponding circuits of the device shown in FIG. 3.

The integrator 1 is constituted by an RC circuit comprising a resistor 7 and a capacitor 8 connected in series between ground and the output of the generator of the signal having a frequency proportional to the speed and an amplitude proportional to the speed and inversely proportional to the extent to which the accelerator pedal is is depressed.

The point common to the resistor 7 and the capacitor 8 is connected to the input of the rectifying and filtering circuit 2 which comprises a diode 9 connected to an input of an amplifier 10, the cathode of the diode 9 being moreover connected to ground through a resistor 11 and a capacitor 12 which are connected in parallel. The other input of the amplifier 10 is connected to ground through a resistor 13. The output of the amplifier 10 is connected to this other input through a diode 14.

The output of the amplifier 10, which constitutes the source of the variable reference 1/k, is connected to the input of the zero-crossing detector 17 through a weighting resistor 15. The input of this circuit is furthermore connected to the output of the integrator 1 through a weighting resistor 16.

The zero detector is adapted to deliver the sampling signal to the sampling and memorizing circuit 5 (FIG. 3). One embodiment of the weighting and comparing circuit 3 of the device shown in FIG. 3 is shown in FIG. 6.

It comprises three weighting resistors 18, 19 and 20 adapted to receive respectively the signals 1/k and F of variable reference and fixed reference and the signal v/k of the generator coupled to the output shaft of the transmission.

These three resistors are connected to the common input of a zero detector 21.

Figure 6:
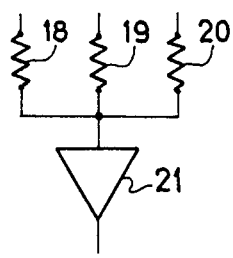
FIG. 6 shows an embodiment of the weighting and comparing circuit which is part of the device shown in FIG. 3.

The circuit of FIG. 6 establishes a threshold whose polarity is opposed to that of the reference signals, and compares to said threshold the signal delivered by the generator.

The circuit 3 shown in FIG. 3 is constructed in such manner that its output is high when the signal delivered by the generator exceeds the weighted sum of the references.

Figure 7:
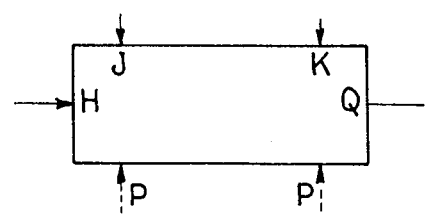
FIG. 7 shows one embodiment of a memory circuit which is part of the construction of the device shown in FIG. 3.

FIG. 7 shows an embodiment of the memory circuit 5 of the device shown in FIG. 3.

This circuit is known under the name of a sampling flip-flop having two inputs.

It comprises at least two inputs J and K, a clock input H and an output Q.

The output Q may change state on one of the edges of the signal applied to the clock input as a function of the levels of the inputs J and K. When these two inputs are at low level or inactive, there is no change of state.

When one of the inputs J or K is at the high level or active, the state that the output Q assumes does not depend on the previous state but only on which of the inputs J or K is active.

Any change in the level of the inputs J or K is without effect until the next active edge at the clock input of the circuit. The flip-flop can moreover comprise another output whose state is always opposed to that of the output Q and one or two other inputs PP which act upon the flip-flop state independently of the signal transition at the input H.

Such a flip-flop may constitute, in itself, the memory circuit of a circuit associated with a transmission having two ratios.

For this purpose, the inputs J and K of the flip-flop are respectively connected to the outputs of the comparators 3 and 4 of the circuit shown in FIG. 3, whereas its clock input is connected to the output of the sampling signal generator 6 shown in FIG. 3 or 4.

The weighting-comparators 3 and 4 are so designed that on the active edge of the sampling signal delivered by the circuit 6, the input J or the input K are at a high level, except when the point representing the state of the transmission is in the hysteresis zone, in which case the inputs J and K are both at low level.

The clock independent inputs PP are available for auxiliary functions.

Figure 8:
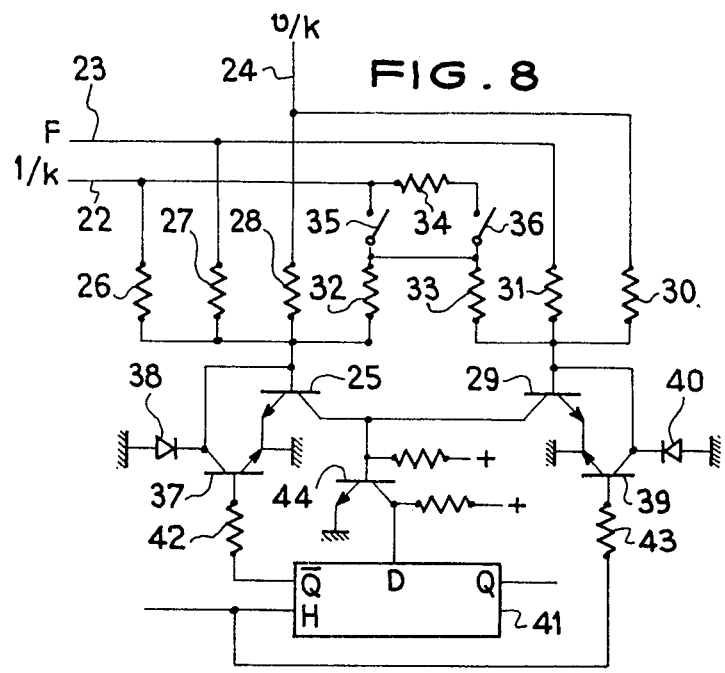
FIG. 8 shows an overall embodiment of the measuring, comparing and memory circuits of the device shown in FIG. 3.

FIG. 8 shows a circuit for ensuring the functions of the comparators 3 and 4 and of the memory circuit 5 shown in FIG. 3.

This circuit comprises three inputs 22, 23, 24 respectively adapted to receive the variable reference signal 1/k delivered by the rectifying and filtering circuit 2, the fixed reference signal F and the signal v/k of the generator coupled to the output shaft of the transmission.

The inputs 22 to 24 are respectively connected to the base of a first transistor 25 through three weighting resistors 26, 27 and 28.

The values of the resistors 26, 27 and 28 are so chosen that the electric signals they receive permit forming at their junction point the equation (2) defined hereinbefore with, for $p_{12}$ and $q_{12}$, the values defined by the relations (5) and (6).

The inputs 23 and 24 are moreover connected to the base of a second transistor 29 each through a weighting resistor 30, 31.

The values of the resistors 30 and 31 are so chosen that the electric signals they receive permit forming the equation (1) with, for $p_{21}$, the value defined by the relation (4).

The bases of the transistors 25 and 29 are moreover connected to each other through two resistors 32 and 33, the common point of these resistors being connected to the input 22, on one hand, through a switch 35 and, on the other hand, through a resistor 34 and a switch 36 connected in series.

The emitter of the transistor 25 is connected to ground whereas its collector is connected to the collector of the transistor 29.

The base of the transistor 25 is moreover connected to its emitter through the collector-emitter path of a third transistor 37 whose collector is connected to ground through a diode 38 and whose emitter is directly connected to ground.

Likewise, the base of the transistor 29 is connected to its emitter through the collector-emitter path of a fourth transistor 39 whose collector is connected to ground through a diode 40 and whose emitter is directly connected to ground.

The base of the transistor 37 is connected to the output $\overline{Q}$ of the memory circuit 41 through a resistor 42 whereas the base of the transistor 39 is connected to the clock input of the circuit 41 through a resistor 43.

The point common to the collectors of the transistors 25 and 29 is connected to the base of a fifth transistor 44 whose emitter is connected to the input D of the memory circuit 41.

The circuit 41 is a sampling flip-flop whose single input D replaces the two inputs J and K of the flip-flop shown in FIG. 7. On the rising edge of the signal applied to the input H, the state of the input D is reproduced at the output Q and maintained until the next rising edge of H. The output $\overline{Q}$ is complementary to the output Q.

The output of the circuit 41, constituted by its terminal Q, controls through an amplifier (not shown) means for actuating the transmission, said means being for example an electromagnet relay coil, an electrically-operated valve or an electromagnetic clutch.

Figure 10:
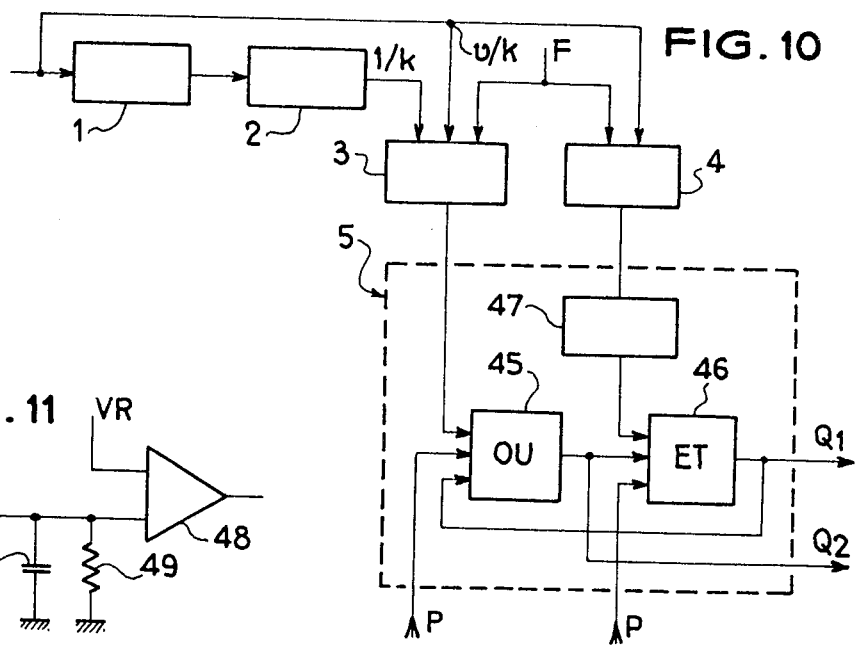
FIG. 10 is a synoptic diagram of a modification of the transmission ratio selecting device according to the invention.

FIG. 10 is a block diagram of a modification of the device shown in FIG. 3 in which there are shown: the integrator circuit 1, the filtering and rectifying circuit 2, the weighting-comparator circuits 3 and 4 and a memory circuit 5. On the other hand, the circuit for generating the sampling signal does not exist.

The embodiments of the circuits 1, 2, 3 and 4 described hereinbefore are equally applicable to the device shown in FIG. 10.

In the block in dotted line shown in FIG. 10, one embodiment of the memory circuit 5 is shown comprising two logic "OR" and "AND" gates 45 and 46 which are looped to each other and a timing circuit 47.

The "OR" and "AND" gates constitute a memory circuit in which the activity of the two inputs is independent of any auxiliary signal. The inputs of the "OR" and "AND" gates are respectively active at high level and low level. The outputs take the state of the active input. When the two inputs are inactive, the output retains the last state it was put in.

The output of the comparator 3 is directly connected to an input of the "OR" gate 45.

The output of the comparator 4 is connected to the input of the timing circuit 47 whose output is connected to the input of the "AND" circuit 46. Either of the outputs of the logic gates constitutes the output of the memory circuit 5.

There has also been shown in each logic gate a third input P which is available for auxiliary positioning functions.

Figure 11:
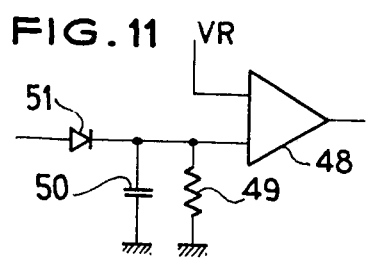
FIG. 11 shows an embodiment of a timing circuit which is part of the device shown in FIG. 10.

FIG. 11 shows an embodiment of the timing circuit 47: this circuit comprises a comparator 48 whose output constitutes the output of the circuit and whose inputs are connected, one, to a source of fixed reference voltage VR, the other, to a resistor 49 connected to ground, to a capacitor 50 also connected to ground, and to a rectifying diode 51 connected to the input of the timing circuit.

Figure 12:
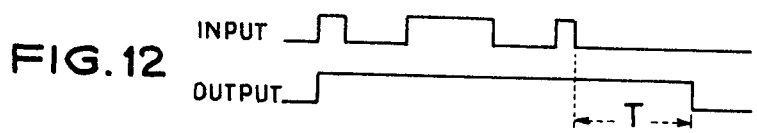
FIG. 12 is a graph showing the signals at the input and output of the circuit shown in FIG. 11.

As shown in FIG. 12, when the timing circuit 47 receives a positive signal, the output rises within a very brief delay. When the signal falls, the output falls only at the end of a period of time T, and on condition that the input signal has not risen in the meantime. The duration T is chosen to be at least equal to the period of the signal that issues from the generator at speed $V_{21}$.

If the circuit 5 is in accordance with the foregoing description, the operation of the device shown in FIG. 10 requires that each one of the weighting-comparators 3 and 4 be so designed that the pulses it delivers when the point representing the conditions of operation is to the right of the characteristic corresponding thereto in FIG. 2, are positive.

The device comprising the circuits of FIGS. 4 and 8 operates in the following manner:

As already mentioned, the selecting device is assumed to be applied to a transmission having two ratios, the characteristics of the change between these ratios being determined, by way of example, by the straight lines $V_{12} W_{12}$ and $V_{21} W_{21}$ shown in FIG. 2.

It is assumed that the vehicle equipped with the transmission to be controlled by the device according to the present invention is stationary and that the ratio engaged is the ratio 1. According to FIG. 9, the output $\overline{Q}$ of the circuit 41 is therefore in the low state.

The output shaft of the transmission is rotated so that the generator (not shown) coupled to this output shaft delivers an electric signal whose frequency is proportional to the speed v of the shaft and whose amplitude is proportional to the speed v and inversely proportional to the variable k which is related to the extent to which the accelerator is depressed.

This signal, whose amplitude is proportional to v/k and whose frequency is proportional to v, is applied to the input of the integrator 1 which transmits the signal with an attenuation substantially proportional to frequency, the output signal of the latter is rectified and filtered by the circuit 2 and applied in the form of a variable reference signal 1/k to the input of the weighting and comparing circuit 3 adapted to produce the characteristic of change from ratio 1 to ratio 2 (FIG. 3.).

There will now be described the manner in which the variable reference signal is obtained with reference to FIG. 4 and to the curves shown in FIG. 5.

The RC circuit, constituted by the resistor 7 and the capacitor 8, receives the signal (a) whose amplitude and frequency are proportional to speed v and delivers, at the terminals of the capacitor 8, a signal (b) whose amplitude is substantially proportional to that of the signal (a) and inversely proportional to the frequency of this signal. Thus on one hand the amplitude of signal (b) is independent from speed and on the other hand the variations of signal (a) as a function of the engine load are reflected on signal (b). The passages through 0 of the signal (b) are slightly in advance with respect to the peaks of the signal (a).

The signal (b) is then rectified by the diode 9 and filtered by the capacitor 12 and the resistor 11 connected in parallel with the capacitor 12, then applied to the amplifier 10. The diode 14, which is in the feedback loop of this amplifier, ensures a compensation for the voltage drop in the diode 9.

The output signal (c) of the amplifier 10 constitutes the variable reference signal. Its amplitude is substantially that of the signal (b). It is substantially proportional to 1/k and independent from speed.

The signals (b) and (c) are applied to the zero detector 17 respectively through the resistors 16 and 15.

Figure 5:
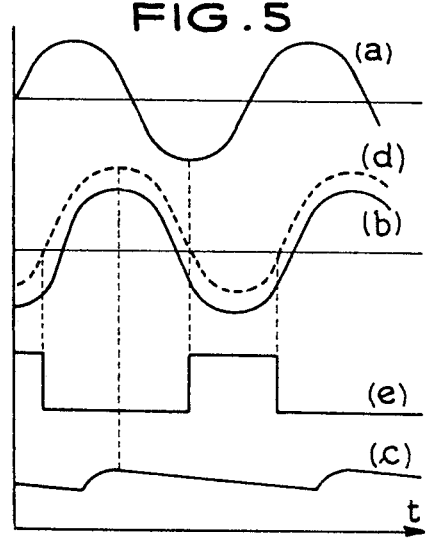
FIG. 5 is a graph showing the electric signals at various points of the circuit shown in FIG. 4.

The weighted sum of the signals (b) and (c) thus obtained forms the signal (d) which is constantly more positive than the signal (b) and shown in dotted line in FIG. 5. The passages through zero of the signal (d) in the positive-negative direction therefore lag with respect to those of the signal (b).

The values of the resistors 16 and 15 are so chosen that the absolute value of the offset between the negative going zero crossing of the signal (d) and the negative peak of the signal (a) is reduced to a minimum in the range of the useful frequencies.

Thus the zero detector 17 produces a rectangular signal (e) synchronized with the zero passages of the signal (d).

This signal is adapted to trigger the memory circuit (FIG. 3) by its rising edge.

The time constant of the filtering circuit 12, 11 is so chosen that the peak level of the integrated signal is retained without excessive loss at the output of the amplifier 10 until the instant of sampling, that is to say during about a quarter of a period.

With reference once more to FIG. 3, it will be observed that the weighting and comparing circuit 3 also receives at a second of its inputs the signal delivered by the generator keyed to the output shaft of the transmission and, at a third input, a constant reference voltage F, these two signals being adapted to define with the variable reference signal delivered by the rectifying and filtering circuit 2, the situation in FIG. 2 of the point representing the conditions of operation with respect to the characteristic $V_{12}W_{12}$. These three signals are respectively applied to the resistors 28, 27 and 26 of the circuit shown in FIG. 8 and consequently to the base of the transistor 25 whose state is moreover controlled by that of the transistor 37 which is itself controlled by the circuit 41.

The circuit 4 shown in FIG. 3 receives at one of its inputs the signal delivered by the generator and at its other input the reference voltage F, these two signals being adapted to define the situation in FIG. 2 of the point representing the conditions of operation with respect to the characteristic $V_{21}W_{21}$. These two signals are respectively applied to the resistors 31 and 30 (FIG. 8) and, consequently, to the base of the transistor 29 whose state is moreover controlled by that of the transistor 39 itself controlled by the sampling signal.

Figure 9:
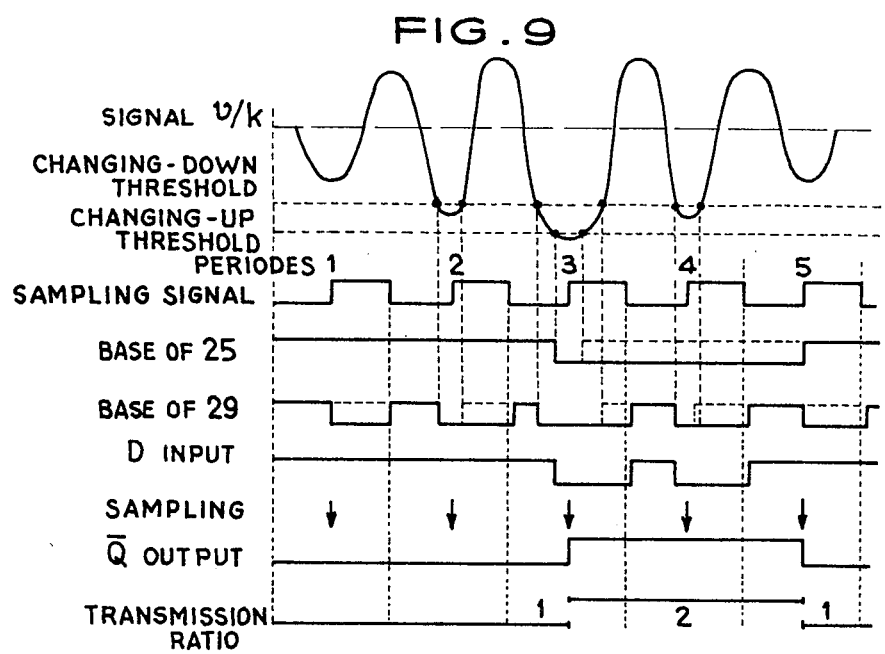
FIG. 9 is a graph showing the signals at certain points of the diagram shown in FIG. 8.

As shown at FIG. 9, periods 1 and 2, so long as the point representing the conditions of operation remains to the left of the characteristic $V_{12}W_{21}$, the signal v/k does not cross the changing up negative threshold established by the positive references F and 1/k through resistors 26 and 27, the base of the transistor 25 remains constantly high, the base of the transistor 44 remains low, and the input D of the circuit 41 remains high. On the rising edge of the sampling signal the circuit 41 is confirmed in its state corresponding to ratio 1. At period 2 the signal v/k crosses the changing down negative threshold established by the positive reference F through the resistor 31. The base of transistor 44 is held low by the transistor 25. At period 3 the representative point passes through the characteristic $V_{12}W_{12}$, it is already to the right of the characteristic $V_{21}W_{21}$. Thus the signal v/k crosses the changing up threshold. As the sampling signal rises, the bases of the transistors 25 and 29 are both low, as is consequently the input D of the circuit 41. The rising edge of the sampling signal causes the change in state of the outputs Q and $\overline{Q}$ of the circuit 41. The output $\overline{Q}$ changes to the high state so that the transistor 37 maintains the base of the transistor 25 in the low state. The transistor 39 maintains the base of the transistor 29 in the low state until the falling edge of the sampling signal is reached. The input D of the circuit 41 is therefore still low upon the fall of the sampling signal so that no undesirable change in state of the circuit 41 can occur either during the sampling pulse or at its falling edge.

The change in state of the circuit 41 causes the changing of the transmission to the ratio 2. So long as the output $\overline{Q}$ remains high, the transmission remains in the ratio 2 and the base of the transistor 25 is held low by the transistor 37. The state of the base of the transistor 29 is transmitted to the input D. At the end of the low alternations of the sampling signal, this state indicates the situation of the representative point with respect to the characteristic $V_{21},W_{21}$. So long as this point remains on the right of $V_{21}$, $W_{21}$, the input is low at the moment of the sampling and the circuit 41 is confirmed in its state corresponding to the ratio 2. That situation is shown in period 4 in FIG. 9.

At period 5 the representative point passes to the left of the characteristic $V_{21}$, $W_{21}$, the signal v/k does not cross the changing down threshold, and the input D of the circuit 41 is high at the rise of the sampling signal. The outputs Q and $\overline{Q}$ of the circuit 41 resume their initial state and the transmission once more changes to ratio 1.

The closure of the switch 35 or 36 increases the weight of the variable reference in the two comparisons, translating the characteristics $V_{12},W_{12}$ and $V_{21},W_{21}$. Consequently, the two characteristics are displaced to the right, that is to say toward higher speeds.

The devices just described ensure the selection of the ratios of a transmission having two ratios.

However, in most cases, transmissions, and in particular those of automobile vehicles, are transmissions having at least three ratios.

It is sufficient in order to adapt the selecting device according to the invention to a transmission having three transmission ratios, to provide two groups of the comparator circuits, such as the circuits 3 and 4 shown un FIGS. 3 and 10, connected to an integration circuit 1 through a rectifying and filtering circuit 2 and possibly to a sampling signal generator 6 which are common, and two memory circuits such as the circuit 5.

Figure 14:
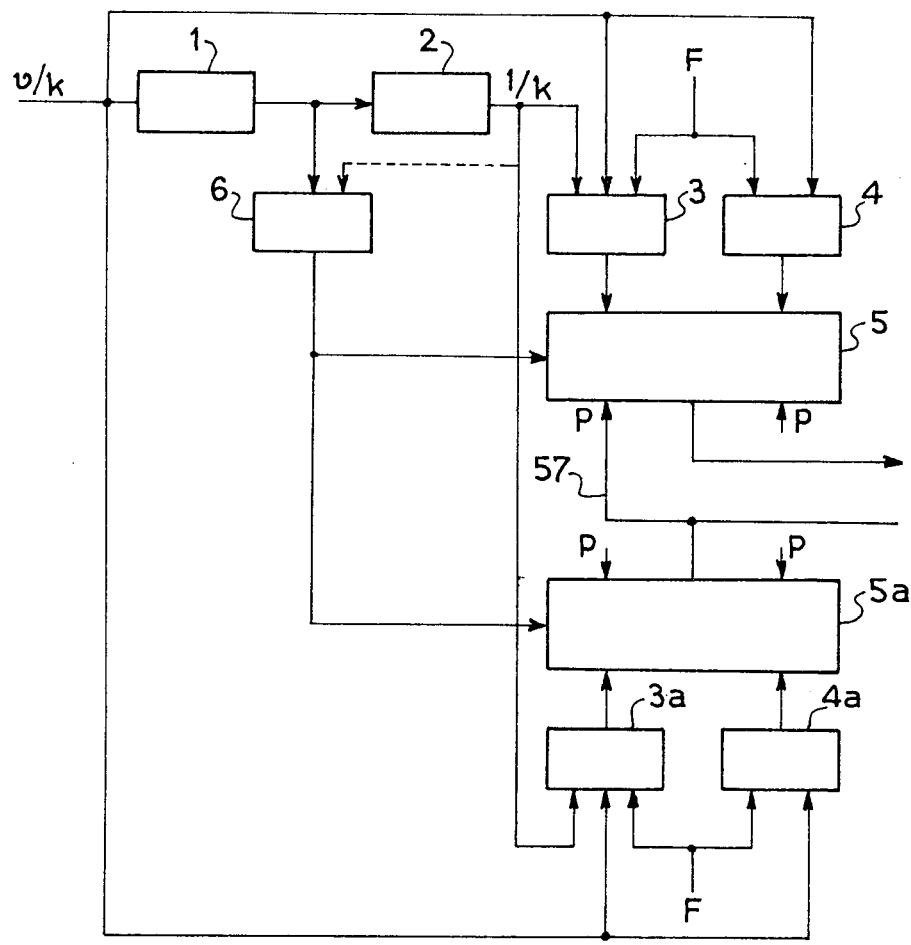
FIG. 14 is a bloc diagram of the ratio selecting device for a transmission having three ratios.

The diagram shown in FIG. 14 shows an embodiment of a selecting device for a transmission having three ratios. Two weighting and comparing circuits $3^a$ and $4^a$ and a memorizing circuit $5^a$ have been added to the circuit of FIG. 3. All inputs of circuits $3^a$ and $4^a$ are connected like the corresponding inputs of circuits 3 and 4. The memory circuit $5^a$ is connected to the outputs of circuits 6, $3^a$ and $4^a$. Furthermore, the output of circuit $5^a$ is connected through the link 57 to one of the auxiliary inputs PP of circuit 5.

FIG. 2 shows an example of changing characteristics of a transmission having three ratios comprising two changing up characteristics, $V_{12},W_{12}$ and $V_{23},W_{23}$ which respectively correspond to changing from ratio 1 to ratio 2 and from ratio 2 to ratio 3 and two changing down characteristics $V_{32},W_{32}$ and $V_{21},W_{21}$ which respectively correspond to changing from ratio 3 to ratio 2 and from ratio 2 to ratio 1.

The characteristics of FIG. 2 define six zones. In respect of three thereof the ratio is determined. For two other zones, the ratios may be one or the other of two successive ratios (1 or 2 for one, 2 or 3 for the other). For one of the zones, the ratio may be one of the ratios 1, 2 or 3.

The existence of the latter zone permits using as best as possible the reasonable range of speeds of the engine and reducing the frequency of ratio changes.

Referring once more to FIG. 14, the circuit 5 memorizes the crossing of the characteristic $V_{12},W_{12}$ from left to right, and the crossing of the characteristic $V_{21},W_{21}$ from right to left. Likewise, the circuit $5^a$ memorizes the crossing of the characteristic $V_{23},W_{23}$ from left to right and the crossing of the characteristic $V_{32},W_{32}$ from right to left. Each of the circuits 5 and $5^a$ has two stable states in the hysteresis zone, that is to say when the point representing conditions of operation is located between the two characteristics concerning it.

In respect of one of the states of the circuit 5, the transmission must give ratio 1. For the other state, it may give ratio 2 or 3.

In respect of one of the states of the circuit $5^a$, the transmission may give ratio 1 or 2, for the other it must give ratio 3.

To any transmission ratio there corresponds a single state of each of the circuits 5 and $5^a$ so that the construction of transmission actuating means presents no difficulty.

However, as the two hysteresis zones overlap, a fourth stable state which does not correspond to any transmission ratio could exist.

The circuit 5 is connected to the circuit $5^a$ by a connection 57 adapted to reduce the number of stable states to three. This connection joins an output of the circuit $5^a$ to an auxiliary input of the circuit 5, for example an input P of the circuit shown in FIG. 7 or of the circuit 5 shown in FIG. 10.

The connection 57 is established in such manner that when the circuit $5^a$ is in its state indicating that the ratio into which the transmission is put is the ratio 3, the circuit 5 is forced to the state corresponding to the ratio 2 or 3.

Consequently, if in the course of operation the transmission gives ratio 1 and that, owing to a spurious effect, the circuit $5^a$ accidentally passes to the state "3", the circuit 5 passes to the state "2 or 3" and the transmission can thus change from ratio 1 to ratio 3.

On the other hand, when the circuit $5^a$ is in the state "3", the circuit 5 cannot pass to state "1", so that the transmission cannot change directly from ratio 3 to ratio 1.

Figure 13:
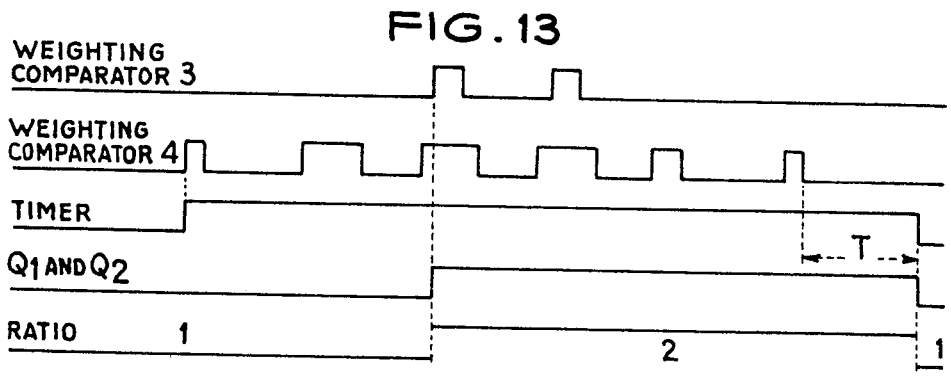
FIG. 13 is a graph showing the signals at the different points of the circuit shown in FIG. 10.

The operation of the device shown in FIG. 10 may be understood from the graph shown in FIG. 13 where the output signals of the weighting-comparators 3 and 4, of the timing circuit and of the whole of the memory circuit 5, and the selected transmission ratio are shown.

When the point representing the conditions of operation is to the left of the characteristics $V_{21}$, $W_{21}$, no pulse issues from the comparators 3 and 4. The output of the comparator 3 is inactive, the output of the timing circuit is constantly low and forces the memory loop to the low state. The transmission gives ratio 1.

When the representative point passes to the right of $V_{21}$, $W_{21}$, pulses issue from the comparator 4 at intervals less than the duration T of time delay so that the output of the timing circuit rises and remains high, that is to say, inactive. The output of the comparator 3 remains low and inactive. The memory loop remains in the low state and the transmission remains at ratio 1.

When the representative point passes to the right of $V_{12}$, $W_{12}$, positive pulses issue from the comparator 3. They are active on the memory loop which assumes the high state. The transmission changes to the second ratio.

When the representative point passes again to the left of $V_{12}$, $W_{12}$, all action ceases on the memory loop which retains the state corresponding to the second ratio.

It is only when the representative point passes again to the left of $V_{21}$, $W_{21}$ that the pulses cease at the output of the circuit 4 and that at the end of the delay T the output of the timing circuit drops and forces the memory loop to the state corresponding to ratio 1.

In the embodiments described hereinbefore, the change characteristics of the transmission are straight lines.

However, it is possible to envisage a selecting device whose operation would be based on ratio change characteristics which are non-linear.

For this purpose, it is sufficient to insert in the circuit producing the variable reference signal 1/k a non-linear generator adapted to produce, in combination with the device coupled to the output shaft of the transmission, the desired ratio change characteristic.

Although it gives the expected results, the device hereinbefore described has its cost increased by the circuit for rectifying and filtering the additional signal and by the sampling circuit or by the timing circuit.

It also has the following drawback:

When the driver releases the accelerator pedal while the transmission is at a given transmission ratio i and the speed of the vehicle exceeds the speed Vij, the coefficient k decreases to its minimum value and a change to the upper ratio j takes place upon the downwards crossing of the characteristic Vij Wij of change between the ratio i and the ratio j as shown in FIGS. 1 and 2.

This changing to a higher ratio takes place even if the action of the driver was intended to obtain a slowing down and even if furthermore a movement in the opposite direction of the accelerator pedal occurs a short period after to achieve an acceleration.

The slowing down, then the acceleration are both adversely affected by the change to the higher ratio.

Moreover, in the desire to reduce energy losses related to engine rotational speed, the designer must choose the point Vij of each one of the characteristics of the changing up so that, at a speed just upper than Vij, the available driving torque at the output of the transmission is just high enough to ensure that an acceleration usually satisfying the driver can be obtained without changing-down in horizontal travel. Consequently, under the same conditions, but on a slope, the acceleration obtained is insufficient.

The device for selecting the characteristics of a transmission which will now be described should not have undesirable reactions upon movements of the accelerator;

must have a satisfactory performance on slopes as well as in horizontal travel;

have circuits which are as simple as possible.

Figure 15:
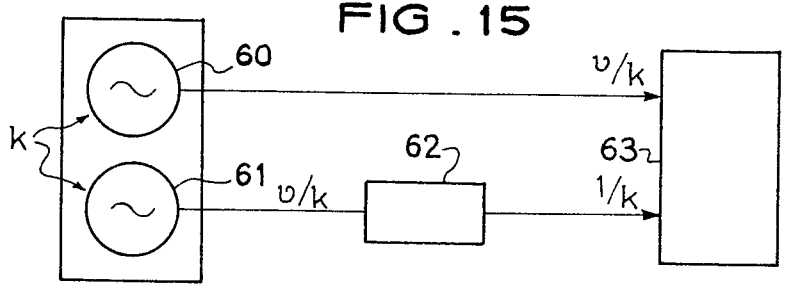
FIG. 15 is a diagrammatic view of an improved selecting device according to the invention.

The device shown diagrammatically in FIG. 15 comprises two alternating signal generators 60 and 61 both coupled to the output shaft of the transmission and to the carburettor.

The output signal of the generator 61 leads in phase the output signal of the generator 60.

The generator 61 is connected to an integrator 62 whose output signal is proportional to 1/k and is in phase with the output signal of the generator 60 since the phase lag produced by the integrator 62 is compensated for by the lead in phase of the generator 61 with respect to the generator 60.

The remainder of the device shown in FIG. 15 is identical to the corresponding part of the selecting device shown in FIG. 10 except that it does not have a rectifying and filtering circuit. It is represented by a rectangle 63.

Figure 16:
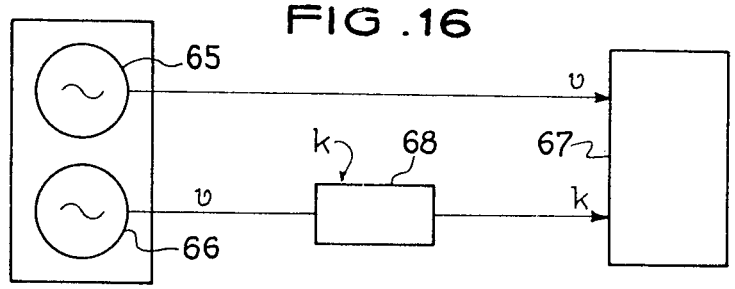
FIG. 16 is a diagrammatic view of another embodiment of the device according to the invention.

The device shown in FIG. 16 also comprises two generators 65 and 66. The output signals of these generators are proportional to v in amplitude and frequency.

The generator 65 is directly connected to a circuit 67 corresponding to the circuit 63 shown in FIG. 15, and the generator 66 is connected to the same circuit through an integrator 68 coupled to the carburettor in such manner that its attenuation is proportional to 1/k, so that the output signal is proportional to the parameter k. The circuit 67 is identical to the circuit 75 shown in FIG. 18 and shown in more detail in FIG. 25.

As in the device shown in FIG. 15, the generator 66 delivers an output signal which leads in phase the output signal of the generator 65. This lead in phase compensates for the delay produced by the integrator 68.

Figure 17:
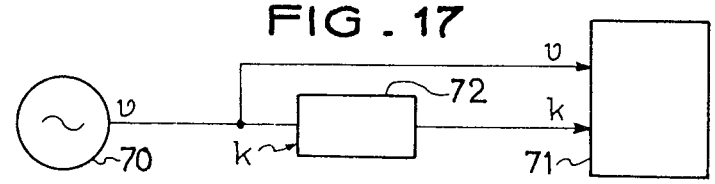
FIG. 17 is a diagrammatic view of a third embodiment of the device according to the invention.

The device shown in FIG. 17 comprises a single generator 70 whose output signal is proportional to the speed v. The generator 70 is connected, on one hand, directly to an input of a circuit 71 corresponding to the circuits 63 and 67 shown in FIGS. 15 and 16, and, one the other, to another input of the circuit 71 through an integrator 72 coupled to the carburettor. The integrator provides signals proportional to k.

Figure 18:
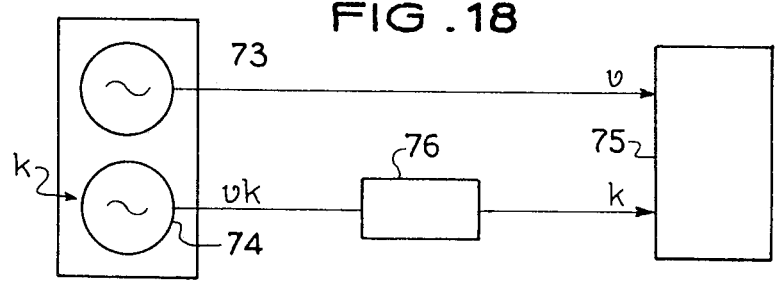
FIG. 18 is a diagrammatic view of a modification of the device shown in FIG. 16.

The device shown in FIG. 18 also comprises two generators 73 and 74 whose out-of-phase signals are respectively proportional to v and to vk, the generator 74 being coupled to the carburettor in such manner that the magnetic flux through its output winding is proportional to k.

The generator 73 is directly connected to a circuit 75 identical to the circuit 67 shown in FIG. 16, and the generator 74 is connected to the circuit 75 through an integrator 76, whose phase lag is compensated for by the lead of the generator 74 with respect to the generator 73 and whose output signal amplitude is proportional to k.

Figure 19:
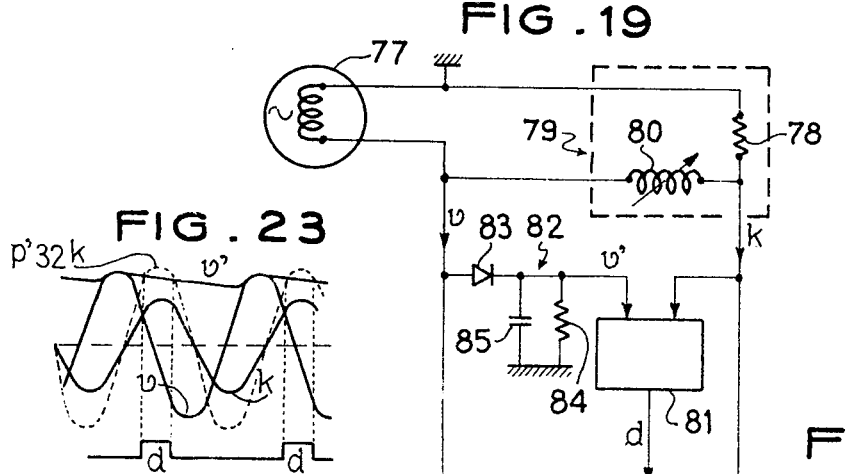
FIG. 19 is a more detailed diagram of the device shown in FIG. 17.

The circuit shown in FIG. 19 which is an embodiment of the circuit of FIG. 17 employs a monophase alternator 77 as a generator of signals. Connected to the grounded terminal of the output winding of the alternator 77 is a resistor 78 which is part of an integrator 79 which further comprises a variable inductance 80 connected between the resistor 78 and the other terminal of the output winding of the alternator 77, the value L/k of said inductance varying between L and a minimum L/K as a function of the load on the engine.

There is at the output of the alternator opposed to the ground a signal proportional to the speed v of the output shaft of the transmission to be controlled and at the terminal common to the resistor 78 and the inductor 80 the output signal is proportional to k owing to the fact that the element ensuring the modification of the variable inductance is coupled to the accelerator pedal of the vehicle (not shown). As both voltage at the input of the integrator 79 and attenuation of the latter are proportional to frequency, the output signal amplitude is indepedent from v.

The output of the alternator proportional to v is connected to an input of a first weighting and comparing circuit 81 whose second input is connected to the output of the integrator 80. The circuit 81 is connected to the alternator through a rectifying and filtering circuit 82 comprising a diode 83 in series and a resistor 84 and a capacitor 85 connected in parallel between the cathode of the diode 83 and ground.

The output of the weighting and comparing circuit 81 is connected to an input of a memory circuit 86 whose other input is connected to the output of another weighting and comparing circuit 87.

This other weighting and comparing circuit comprises a first input directly connected to the output proportional to v of the alternator 77, a second input connected to the output of the integrator 79 proportional to k through a rectifying and filtering circuit 88 similar to circuit 82, and a third input to which a reference level F is applied. The circuits 81–88 constitute the circuit 71 shown on FIG. 17.

Figure 20:
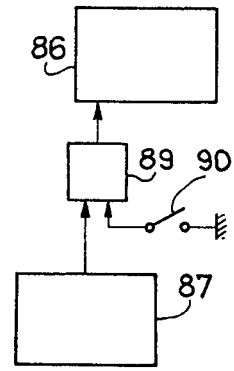
FIGS. 20, 21 and 22 are partial diagrams of modifications made in the device shown in FIG. 19.

FIG. 20 shows a part of the circuit shown in FIG. 19 so modified as to render this device responsive to the action of the acceleration of the output shaft of the transmission.

Figure 29:
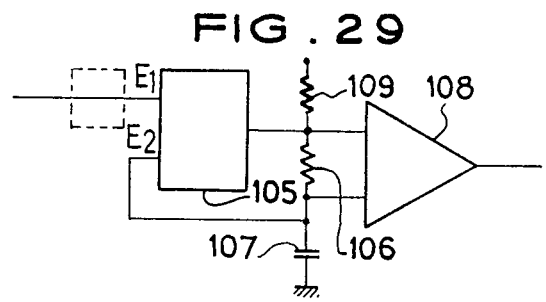
FIG. 29 is a diagrammatic view of a first embodiment of the device according to the invention for avoiding the changing of the transmission to a higher ratio during slowing down.
Figure 30:
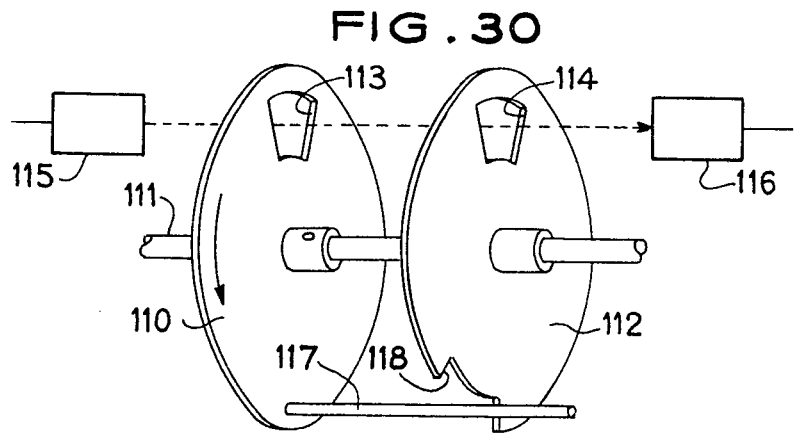
FIG. 30 shows another embodiment of the device shown in FIG. 29.

For this purpose, there is interposed between the memory circuit 86 and the weighting and comparing circuit 87 a logic gate 89 whose input 90 is connected to the output of a device detecting an increase or decrease in speed, such as the device of FIG. 29 or 30.

Figure 21:
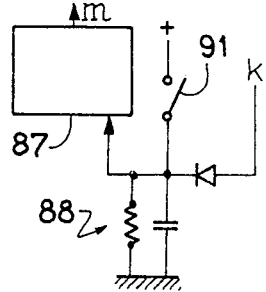

FIG. 21 shows another embodiment of the modification shown in FIG. 20.

A switch 91 controlled by said device of FIG. 29 or 30 connects the point common to the diode and the RC circuit of the rectifying and filtering circuit 88 to a point of positive voltage.

Figure 22:
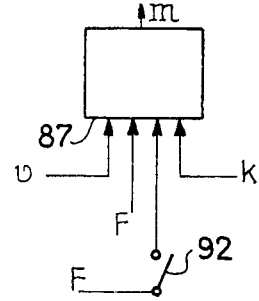

FIG. 22 shows a modification of the circuit shown in FIG. 21 in which the weighting and comparing circuit 87 has four inputs instead of three. The fourth input 92 is connected to the aforementioned speed variation responsive device. When the input 92 is not activated the threshold opposed to the signal v is high enough to prevent the production of signals "m" at the output of circuit 87. Normal operation is obtained when the input 92 is activated.

Figure 25:
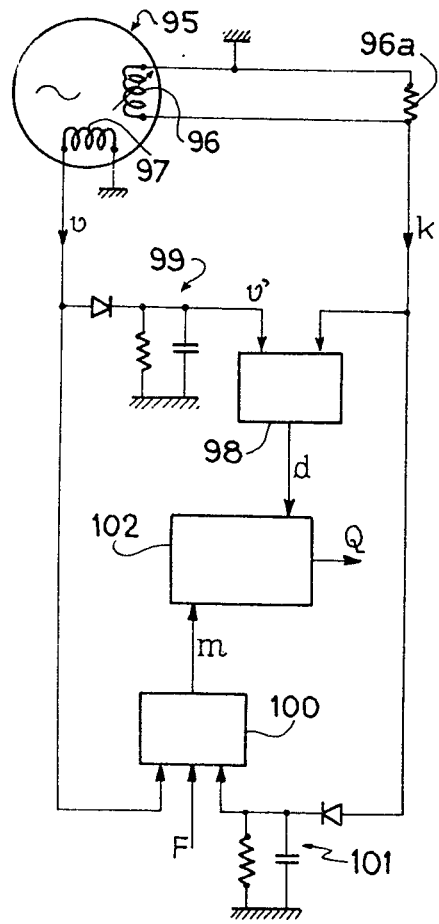
FIG. 25 is a more detailed diagram of the device shown in FIG. 18.

FIG. 25 shows an embodiment of the device shown in FIG. 18.

The two generators 73 and 74 and the integrator 76 shown in FIG. 18 are embodied in FIG. 25 by a diphase alternator 95 coupled to the carburettor and a resistor $96^a$. The alternator 95 comprises a first output winding 97 delivering a signal proportional to v and a second winding 96 at the terminals of which is connected the resistor $96^a$ and which delivers directly a signal proportional to k as is explained hereinafter.

The winding 96 is connected to an input of a first weighting and comparing circuit 98 and the winding 97 is connected to another input of this circuit through a rectifying and filtering circuit 99. The windings 96 and 97 are moreover connected to two inputs of a second weighting and comparing circuit 100 whose third input is connected to a reference level F. A rectifying and filtering circuit 101 is interposed between the winding 96 and the circuit 100 in the case where the device is rendered non-responsive to a sudden rise in the accelerator. The outputs of the circuits 98 and 100 are connected to the inputs of a memory circuit 102. The circuits 98 to 102 constitute the circuit 75 shown in FIG. 18.

The modifications shown in FIGS. 20–22 are also applicable to the circuit shown in FIG. 25.

Figure 28:
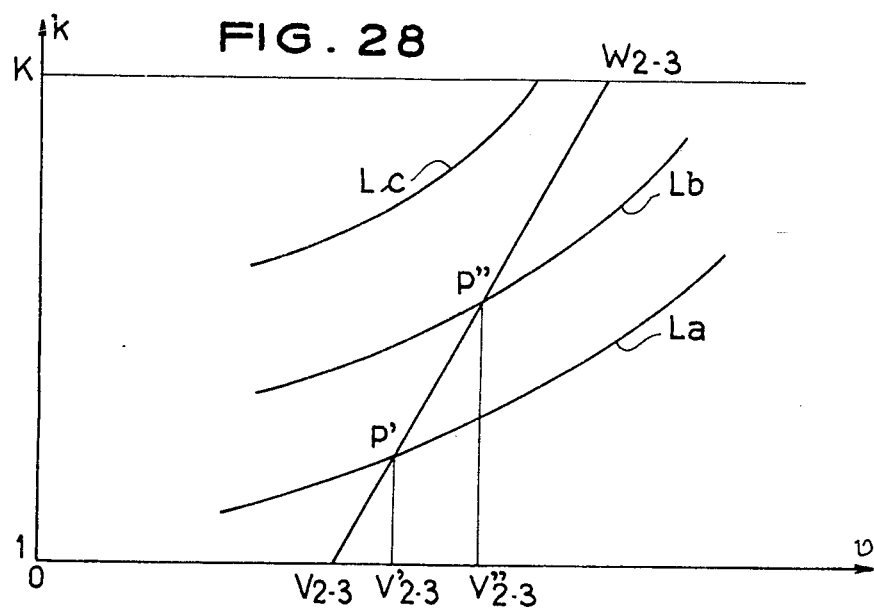
FIG. 28 is a graph showing for different conditions of operation at constant speed the relation between the speed v and the coefficient k representing the load of the engine.

FIG. 28 shows a graph in which there are shown in plane v, k, a characteristic $V_{23} W_{23}$ of change from ratio 2 to ratio 3, and three curves $L_a$, $L_b$, $L_c$ representing, when the transmission is in ratio 2 and for different conditions of operation, the relation between the speed v and the parameter k at constant speed that is when the resistance opposed to the vehicle progression balances the torque at the output of the vehicle transmission. The speed increases above these curves and decreases below.

From $L_a$ to $L_b$ then to $L_c$, the total resistance to the progession of the vehicle increases owing to an increased slope of the road, increased resistance to travel, increased load on the vehicle, increased speed of the wind or other reason. Such a displacement of the zero acceleration curves may also be due to a decrease in the density of the air or any other cause which reduces the power of the engine, including faults and cold running of the engine.

In one of its aspects, the invention has for object to prevent a change in the transmission to a higher speed ratio when the point representing the state of the transmission is located below the corresponding zero acceleration curve. Thus, in the case shown in FIG. 28, the lower changing down speed is increased to the value $V'_{23}$, given by the vertical through the point P′ of intersection of the curve La with the characteristic $V_{23} W_{23}$ or to the value $V''_{23}$ given by vertical through the point P" of intersection of the curve Lb with this characteristic.

As the curve Lc does not intersect the characteristic $V_{23} W_{23}$, there is no point corresponding to P' and P" on the latter so that it is possible to completely avoid the change to the third ratio when the resistance to advance is high.

The circuit shown in FIG. 29 permits putting into practice the graph shown in FIG. 28.

The circuit comprises a phase-locked loop circuit (PLL) 105 whose input $E_1$ is connected to the output of the generator or to that of the integrator of one of the circuits described with reference to FIGS. 16 to 19 and 25. A shaping circuit shown in dotted line box may be interposed in the circuit, upstream of the input $E_1$. The circuit 105 comprises an oscillator and its output S is connected to a terminal of a resistor 106 connected to ground through a capacitor 107. The point common to the resistor 106 and capacitor 107 is connected to the input $E_2$ of the circuit 105 which controls the frequency of said oscillator.

The two terminals of the resistor 106 are connected to the inputs of a comparator 108 whose output controls the switch 91 of the circuit of FIG. 21 or the inputs 90 or 92 of the circuits of FIG. 20 or 22 respectively.

The terminal of the resistor 106 connected to the output S of the circuit 105 is connected through a resistor 109 to a source of positive or negative voltage.

FIG. 30 shows a rotational acceleration detector which may be driven by the engine through the output shaft of the transmission or through a shaft which is a part of the latter.

It comprises a first disc 110 integral with a shaft 111, for example the output shaft of the transmission. A second disc 112 is freely rotatable on the shaft 111. The disc 110 has at least one opening 113 and the disc 112 has at least one opening 114, the relative positioning of these openings being such that, depending on the relative angular position of the two discs, a light source or emitter 115 placed in front of the disc 110 is seen at least once per revolution by a receiver 116 placed behind the disc 112 or remains masked.

The disc 110 carries a rod 117 parallel to its axis of rotation, the end of the rod 117 being engaged in a notch 118 formed in the disc 112.

The position of the rod 117 and notch 118 with respect to the respective openings 113 and 114 is such that in one of the extreme positions of the rod 117 in the notch 118, the openings 113 and 114 are facing each other, whereas in the other extreme position each opening is masked by a solid part of the other disc.

For the direction of rotation indicated by the arrow in FIG. 30, the openings are facing each other when the disc 110 drives the disc 112. They are masked from each other when the disc 110 retains the disc 112.

These two cases respectively correspond to positive and negative torque on disc 112 and thus to positive and negative acceleration of the shaft 111, ignoring spuruous torques acting on the disc 112.

The output of the receiver 116 has two electric states. As the source 115 is permanently excited, the receiver 116 delivers at least one output pulse per revolution of the shaft 111 when the latter rotates in the indicated direction and its speed is increasing. When the speed of shaft 111 is decreasing, the receiver 116 remains in the state of rest. For an opposite direction of rotation or a symetrical disposition, pulses will be obtained in the case of speed decrease.

By providing slots at intervals which are sufficiently numerous and short, the output pulses of the receiver 116 may be merged into an uninterrupted signal.

The receiver 116 is for example a photoelectric cell and its output is connected in the same manner as the circuit shown in FIG. 29.

The device just described operates in the following manner:

Considering first the circuit shown in FIG. 15, it can be seen that the generator 60 furnishes to the circuit 63 a signal proportional to v/k whereas the generator 61 applies to the input of the integrator 62 a signal also proportional to v/k leading in phase that of the generator 60 an amount adapted to compensate for the phase lag produced by the integrator 62. Attenuated in proportion to the frequency and consequently to speed v, the output signal of the integrator 62 is therefore proportional to 1/k and in phase with the output signal of the generator 60. It is therefore no longer necessary to rectify and filter the integrated signal since it is possible to compare it directly with the signal delivered by the generator 60. Consequently, the circuit 2 of the device shown in FIG. 10 is not needed.

As for the rest, as the circuit 63 shows in FIG. 15 is identical to the circuit shown in FIG. 10, it therefore operates in the same manner as the latter.

The circuits of FIGS. 16, 17, 18, 19 and 25 use signals proportional to v and k instead of signals proportional to v/k and 1/k. Furthermore, it is considered hereinafter that these circuits control the changes from second to third ratios and vice-versa. Consequently, equations (1) and (2) must be re-written:

$$v = p'_{32} k \tag{1'}$$

$$v = p'_{23} k + q'_{23} F \tag{2'}$$

where the weighting coefficients are given by $$p_{32}' = V_{32} \tag{4'}$$

$$p_{23}' = \frac{(W_{23} - V_{23}) V_{32}}{W_{32} - V_{32}} \tag{5'}$$

$$q_{23}' = \frac{V_{23} W_{32} - W_{23} V_{32}}{(W_{32} - V_{32}) F} \tag{6'}$$

The circuit shown in FIG. 16 differs from that shown in FIG. 15 in that the signals produced by the generators 65 and 66 are proportional to v instead of v/k and that the attenuation produced by the integrator 68 is proportional to v/k instead of v. Consequently, the signals furnished to the circuit 67 are respectively proportional to v and k. The utilization thereof will be described hereinafter with reference to FIG. 25.

With regard to the circuits shown in FIGS. 17 and 18, their operation will be described with reference to FIGS. 19 and 25 which are respectively more detailed representations thereof.

The operation of the circuit shown in FIG. 19 will first be examined.

When the output shaft of the transmission to be controlled rotates and the transmission gives a given ratio, the generator 77 delivers signals of amplitude and frequency proportional to the speed of rotation of the output shaft.

These signals are applied to the first input of the weighting and comparing circuits 81 and 87 and to the input of the integrator 79 whose inductance 80 is variable as a function of the position of the accelerator pedal. The output signals of the integrator 79 which are proportional to k like those of integrator 68 shown in FIG. 16 are applied to other inputs of the weighting and comparing circuits 81 and 87.

The signals produced by the generator 77 are rectified and filtered before being applied to the circuit 81 so that they may be compared with the signals from the integrator 79, which are delayed by the integration. Likewise, the signals from the integrator 79 are rectified and filtered by the circuits 88 before being applied to the circuit 87.

It will be considered hereinafter that the described circuits control the change from second to third ratio of a transmission having at least three ratios and vice-versa. The corresponding ratio change characteristics are shown in FIG. 2 by the lines $V_{23} W_{23}$ for changing up from second to third ratio and $V_{32} W_{32}$ for changing down from third to second ratio.

Figure 23:
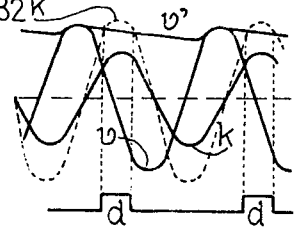
FIGS. 23 and 24 are diagrams showing the shape of the signals at certain points of the device shown in FIG. 19.

FIG. 23 shows the signal v, v' and k at the terminals of the generator 77, at the output of the circuit 82, and at the output of the circuit 79 respectively. The signal v' performs the function of a threshold with respect to the weighted signal $p'_{32}k$. Starting at a point located to the right of the characteristic $V_{32} W_{32}$ for which the output of the circuit 81 remains in its state of rest, the passing of this characteristic causes the production at the output of the weighting and comparing circuit 81 of a pulse d corresponding to the passing through of said threshold by the peak of the signal k.

Figure 24:
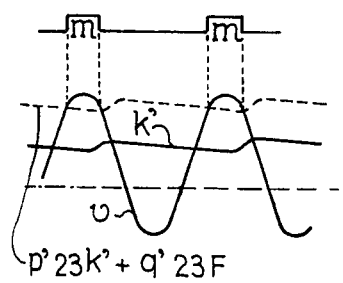

In the circuit 87, it is the weighted sum $p'_{23}k' + q'_{23}F$ of the fixed threshold F and the signal delivered by the circuit 88 which performs the function of a threshold with respect to the signal v. Starting at a point located to the left of the characteristic $V_{23} W_{23}$ of FIG. 2, when this point passes through this characteristic, the peak of the signal v passes through the threshold and a pulse m appears at the output of the weighting and comparing circuit 87 as shown in FIG. 24.

The state of the bistable 86 corresponds to the last pulse received. Its output Q controls the state of the transmission.

In the circuit shown in FIG. 25, the electromotive forces in the output windings of the diphase alternator 95 are proportional in frequency and amplitude to the speed of the output shaft and in quadrature with respect to each other, but as the winding 96 is highly loaded by the resistor $96^a$, the current it supplies is in quadrature with the electromotive force and limited by the self inductance of the winding to a value independent of the frequency and thus of the speed of rotation. The signals at the terminals of the winding 97, on one hand, and at the terminals of the winding 96 and resistor $96^a$ on the other, are therefore in phase. Moreover, the coupling with the carburettor is such that the magnetic flux in the winding 96 and the signal amplitude on resistor $96^a$ are proportional to k and vary as a direct function of the load on the engine.

Figure 26:
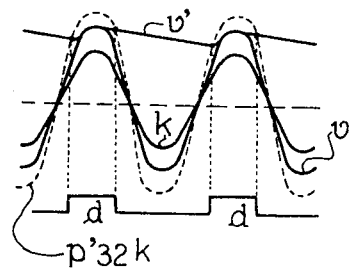
FIGS. 26 and 27 are diagrams showing the shape of the signals at certain points of the device shown in FIG. 25.
Figure 27:
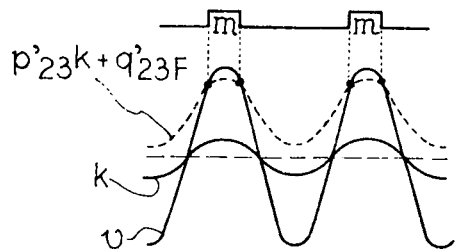

Although the relative phase of the signals k and v are different, the circuits 99 and 98 operate in the same way as their homologous circuits 82 and 81 shown in FIG. 19. As in FIG. 23, there is shown in FIG. 26 the pulse d which issues from the circuit 98 when the peak of the weighted signal $p'_{32}k$ passes through the threshold v'. In FIG. 27 there is shown the signal v and the weighted sum $p'_{23}k + q'_{23}F$ such as it is if the circuit 101 is omitted. The pulse m issues from the circuit 100 when the positive peak of v passes through the positive peak of the weighted sum.

It can be seen that the depressing of the accelerator pedal, causing an increase in k, possibly produces a pulse d and a change to the lower ratio, without intervention of the discharge time constant of the circuits 82, 88 and 99, 101 in FIGS. 19 and 25 respectively. The delay in the action is thus reduced to a minimum, as is usually desired by the driver.

On the other hand, the rising of the accelerator pedal brings into action the discharge time constant of the circuit 88 shown in FIG. 19 so that the possible production of the pulse m is delayed, or even eliminated, when the speed decreases rapidly or when the accelerator is once again depressed within a sufficiently brief delay. The time constant of the discharge of the circuit 88 could be increased beyond the value necessary for the filtering, in order to accentuate this effect. The device shown in FIG. 25 has the same property if it is equipped with the circuit 101.

The operation of the circuit shown in FIG. 29 will be described in particular with reference to the graph shown in FIG. 28.

It concerns avoiding a changing to higher ratio in the transmission in a period of slowing down once it is no more inhibited by the state of the circuit 88, independently of the movement of the accelerator pedal.

The incident signal coming from the generator, for example from the alternator 77 shown in FIG. 19 or the corresponding integrated signal, is applied to the input $E_1$ of the circuit 105 possibly after having been converted into a rectangular signal. The signal given out by the oscillator of the circuit 105 is combined with the input signal and the circuit 105 delivers at its output pulses of positive or negative current depending on the relative phase of the two aforementioned signals. When these signals are in phase, no current is furnished at the output. The current charges or discharges the capacitor 107 through the resistor 106. The voltage at the terminals of the capacitor 107 is applied to the input $E_2$ of the circuit 105 so as to control the frequency of the oscillator.

When the frequency is constant that is to say when the vehicle travels at a constant speed, the oscillator of the circuit 105 gives out a signal of the same frequency and phase as the signal applied to the input $E_1$ of the circuit 105. The resistor 106 has no current. But, in the case of a variation in speed, the signal applied to the input $E_1$ of the circuit 105 becomes in advance or in lag of the signal of the oscillator. A current then passes through the resistor 106 at each period in one direction or the other, depending on the direction of variation of the speed. The comparator 108 is connected in such manner as to deliver at its output in the case of a slowing down of the vehicle, a signal of the desired direction for precluding a change to the upper ratio in the transmission.

When there appears at the output of the comparator 108 shown in FIG. 29 a signal corresponding to the detection by the comparator of a slowing down of the output shaft of the transmission, this signal controls the closure of the switch 91 shown in FIG. 21 which in turn applies a positive voltage to the input of the weighting and comparing circuit 87. The threshold opposed to signal v becomes greater than the amplitude of said signal so that no pulse is produced.

By reason of the presence of the filtering time constant of the circuit 88, the switch 91 raises the threshold opposed to the signal v, even if it clooses only briefly at each period.

At constant frequency, the output of the circuit 105 delivers pulses in order to compensate for the charging or discharging current of the capacitor 107 through the resistor 109 so that the input signal $E_1$ of the circuit 105 and the signal of the oscillator are slightly out of phase. The choice of the connection of the resistor 109 either to a positive or to a negative voltage source permits obtaining as desired at the output of the comparator 108 either pulses for inhibiting the change to the higher ratio or pulses for authorizing this change in the transmission.

In the latter case, the output signal of the comparator 108 can open the gates 89 of FIG. 20 or lower the threshold opposed to the signal v in the circuit 87 of FIG. 22 allowing pulses m to be delivered to the circuit 86.

Instead of the circuit shown in FIG. 29, there could also be employed for authorizing or inhibiting the change to a higher ratio, the device detecting the acceleration of rotation shown in FIG. 30 which, as the preceding circuit provides an authoriztation or inhibition signal resulting from the receiver 116 receiving light from the light source 115 in the event of increase or decrease in speed of the shaft driving it, implying that disc 110 respectively drives or retains the disc 112 whenever the openings are facing each other.

In the case of a rapid rise of the accelerator, the detection of a slowing down by the devices shown in FIG. 29 or 30 occurs during the discharge of the circuit 88 of FIG. 19 consecutive to a decrease in the amplitude of the signal k.

The time constant of circuit 88 allows for the delay of response to a variation of vehicle speed of the devices of FIG. 29 or 30 whichever is used.

When equipped with the circuit 101, the device shown in FIG. 25 is capable of being connected to either of the acceleration detecting devices in a manner identical to the device shown in FIG. 19.

The improvements brought by the embodiments described hereinbefore almost always permit the avoidance of a change to a higher ratio on the transmission upon a sufficiently rapid release of the accelerator and the obtainment at will of a braking action by the engine.

Having now described my invention what I claim as new and desire to secure by Letters Patent is:

1. A device for selecting characteristics of a transmission associated with a motor, in particular for an automobile vehicle, the transmission having an output shaft and permitting a plurality of transmission ratios to be selected, the device comprising a generator of electric signals coupled to the output shaft of the transmission and having an output at which output the generator is capable of generating a first alternating signal whose frequency and amplitude are proportional to the speed of the output shaft of the transmission, means having an output for producing from said first alternating signal an additional electric signal whose level is exclusively a function of the load of the motor, said means for producing said additional signal being connected to the output of said generator and comprising a circuit for integrating with respect to time said first alternating signal, means for producing from said first and additional signals characteristics of change between the ratios of the transmission, means connected to the outputs of the generator and of the means for producing said additional signal, for weighting and comparing said first signal and said additional signal and having outputs at which outputs there is produced signals periodically representing the desired state of the transmission, and means for memorizing the desired state of the transmission, connected to said outputs of the weighting and comparing means, said memorizing means being capable of causing a change from one ratio to a next ratio of the transmission as a function of the said signals produced by said outputs of the weighting and comparing means, which is indicative of the desired state of the transmission said transmission having n ratios, said weighting and comparing means comprising $n-1$ pairs of weighting and comparing circuits each comprising a weighting and comparing circuit for producing the characteristic of change from one ratio of the transmission to the next higher ratio and a weighting and comparing circuit for producing the characteristic of change in the opposite direction, a memorizing circuit being connected to each pair of weighting and comparing circuits.

2. A device as claimed in claim 1, wherein the characteristics of change between the various ratios are linear functions and said weighting and comparing circuits comprise weighting resistors for respectively weighting said first electric signal delivered by the generator keyed on the output shaft of the transmission and, said additional signal whose amplitude is exclusively a function of the load of the motor, the weighting and comparing circuit for producing the characteristic of change from one ratio of the transmission to another ratio further comprising, in the case where said characteristic does not pass through the origin, a resistor for weighting a fixed reference signal, said weighting resistor of each weighting and comparing circuit having a terminal connected to an input of a comparator which has an output connected to an input of the corresponding memorizing circuit.

3. A device as claimed in claim 2, wherein said comparator is a zero detector.

4. A device as claimed in claim 1, wherein each memorizing circuit is a sampling flip-flop having two inputs.

5. A device as claimed in claim 1, wherein the memorizing circuit for ensuring changes between two rotios next to each other has an additional input and each memorizing circuit for ensuring changes between two ratios is connected to the additional input of one of the adjacent memorizing circuits so as to ensure that the transmission does not jump a ratio, at least in one of the directions of change.

6. A device as claimed in claim 1, wherein said memorizing means comprise an OR gate and an AND gate, the OR gate having an output connected to an input of the AND gate, whereas an output of the AND gate is connected to an input of the OR gate, another input of the OR gate being directly connected to the output of the weighting and comparing circuit for producing the characteristic of change from one ratio of the transmission to the next higher ratio, the AND gate having an input connected through a timing circuit to the output of the weighting and comparing circuit for producing the characteristic of a reverse change.

7. A device as claimed in claim 1, wherein said integrating circuit for producing said additional signal comprises a variable inductance and a resistance and is connected to said generator of said first signal, a pedal of an accelerator for the motor being capable of controlling said variable inductance.

8. A device as claimed in claim 1, further comprising means for delaying a change of the transmission from one ratio to a higher ratio in the case of slowing down.

9. A device as claimed in claim 1, further comprising means for precluding a change of the transmission from one ratio to a higher ratio in the case of slowing down.

10. A device as claimed in claim 9, wherein said means for precluding a change of the transmission from one ratio to a higher ratio comprise a detector of an acceleration of the transmission, said detector having an output connected to a logical gate inserted between the weighting and comparing circuit producing the characteristic of change from one ratio to the next higher ratio and said memorizing circuit.

11. A device as claimed in claim 10, wherein the acceleration detector comprises a phase locked loop circuit the input of which is connected to said first generator of electric signal, said phase locked loop circuit being further connected to a threshold circuit the output of which is connected to said logical gate inserted between said weighting and comparing circuit and said memorizing circuit.

12. A device as claimed in claim 9, wherein said means for precluding a change of the transmission from one ratio to a higher ratio comprise a detector of an acceleration of the transmission, said detector controlling a switch connecting one of the inputs of said weighting and comparing circuit producing the characteristic of change from one ratio to the next higher ratio to a D.C. voltage source.

13. A device as claimed in claim 12, wherein the acceleration detector comprises a phase locked loop circuit the input of which is connected to said first generator of electric signal, said phase locked loop circuit being further connected to a threshold circuit the output of which controlling said switch.

14. A device as claimed in claim 9, wherein said means for precluding a change of the transmission from one ratio to a higher ratio comprise a detector of an acceleration of the transmission, said detector being connected to an additional input of said weighting and comparing circuit producing the characteristic of change from one ratio to the next higher ratio.

15. A device as claimed in claim 14, wherein the acceleration detector comprises a phase locked loop circuit the input of which is connected to said first generator of electric signal, said phase locked loop circuit being further connected to a threshold circuit the output of which is connected to said additional input of said weighting and comparing circuit.

* * * * *